(12) United States Patent
Dooley et al.

(10) Patent No.: US 8,664,905 B2
(45) Date of Patent: Mar. 4, 2014

(54) CONTROL OF BRUSHLESS MOTOR

(75) Inventors: Kevin Allan Dooley, Mississauga (CA);
Antwan Shenouda, Mississauga (CA);
Donglin Ma, Mississauga (CA)

(73) Assignee: Pratt & Whitney Canada Corp.,
Longueuil (CA)

( * ) Notice: Subject to any disclaimer, the term of this patent is extended or adjusted under 35 U.S.C. 154(b) by 253 days.

(21) Appl. No.: 12/713,730

(22) Filed: Feb. 26, 2010

(65) Prior Publication Data
US 2011/0210688 A1    Sep. 1, 2011

(51) Int. Cl.
H02P 6/18    (2006.01)

(52) U.S. Cl.
USPC ............................ 318/400.32; 318/400.35

(58) Field of Classification Search
USPC ...................... 318/400.32, 400.34, 400.35
See application file for complete search history.

(56) References Cited

U.S. PATENT DOCUMENTS

| | | | | |
|---|---|---|---|---|
| 4,027,215 | A | * | 5/1977 | Knight et al. ............. 318/400.01 |
| 4,492,903 | A | * | 1/1985 | Knight et al. ............. 318/400.15 |
| 4,642,537 | A | * | 2/1987 | Young ...................... 318/400.35 |
| 4,922,169 | A | | 5/1990 | Freeman |
| 5,057,753 | A | * | 10/1991 | Leuthold et al. ......... 318/400.35 |
| 5,231,338 | A | | 7/1993 | Bulgarelli et al. |
| 5,717,299 | A | | 2/1998 | Inagaki et al. |
| 5,859,512 | A | | 1/1999 | Buethker |
| 5,869,944 | A | | 2/1999 | Tanina |
| 6,879,124 | B1 | * | 4/2005 | Jiang et al. ............... 318/400.35 |
| 6,965,183 | B2 | | 11/2005 | Dooley |
| 7,071,646 | B1 | | 7/2006 | Chen et al. |
| 7,262,539 | B2 | | 8/2007 | Dooley |
| 7,288,910 | B2 | | 10/2007 | Dooley |
| 7,443,642 | B2 | | 10/2008 | Dooley |
| 2002/0167290 | A1 | | 11/2002 | Seki |
| 2002/0171388 | A1 | | 11/2002 | Seki |
| 2009/0009117 | A1 | | 1/2009 | Someya et al. |

OTHER PUBLICATIONS

European search report; Application No. 11250382.6 dated Oct. 25, 2011.
Chen, et al., "A New Cost Effective Sensorless Commutation Method for Bushless DC Motors without Phase Shift Circuit and Neutral Voltage", IEE Transactions on Power Electronics, vol. 22, No. 2, Mar. 2007.
Canadian Intellectual Property Office; Examiner's Requisition dated Dec. 3, 2012.

* cited by examiner

Primary Examiner — Bentsu Ro
(74) Attorney, Agent, or Firm — Norton Rose Fulbright Canada LLP

(57) ABSTRACT

Systems and methods for generating a signal useful in the commutation of current through windings of brushless direct current electric motors are provided. Such methods comprises detecting a kickback pulse in a non-driven winding of a motor; detecting a rotor-induced zero crossing in the non-driven winding following the detection of the kickback pulse; and using the detection of the rotor-induced zero crossing to generate a signal useful in commutation of the motor.

17 Claims, 5 Drawing Sheets

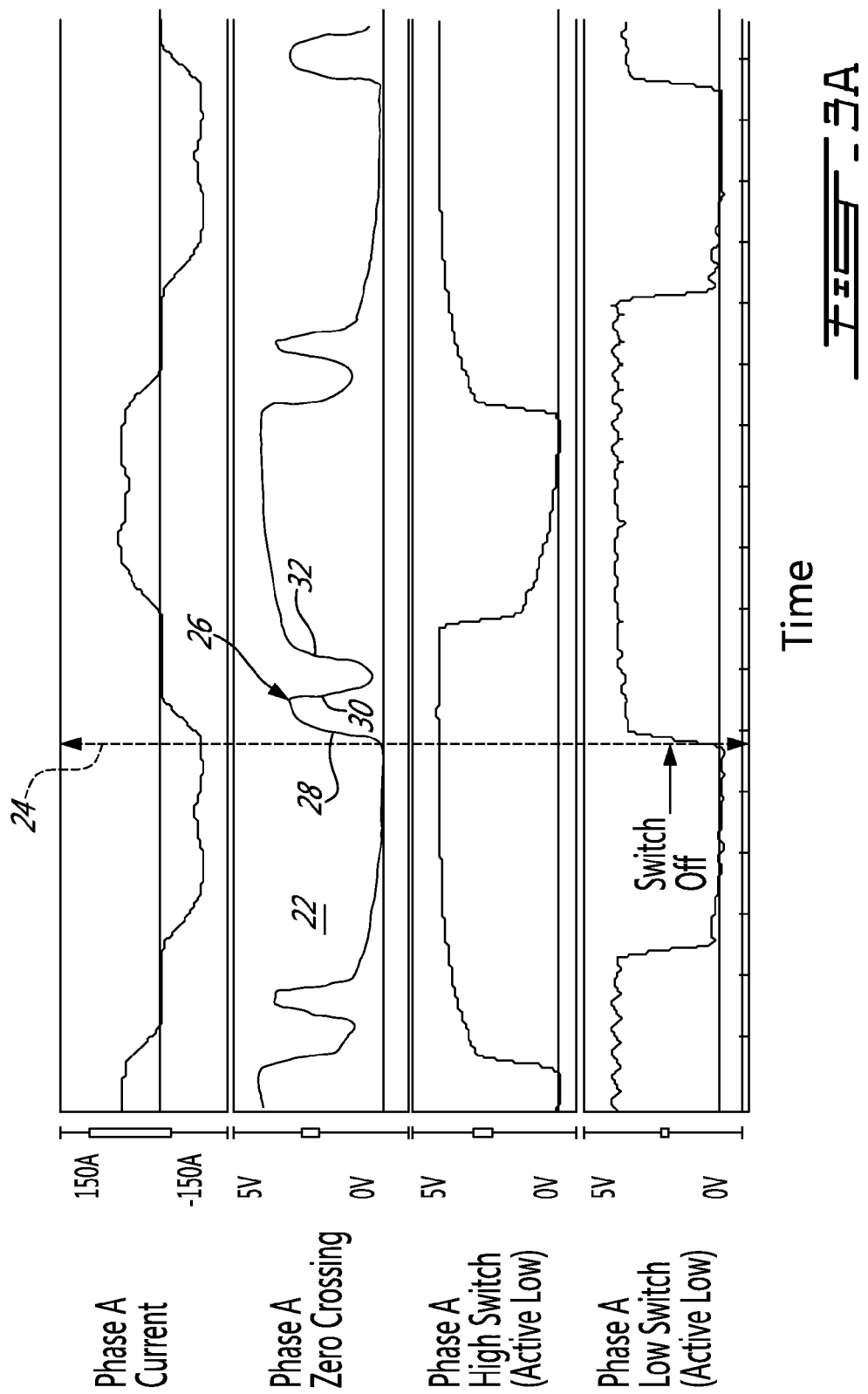

CONTROL OF BRUSHLESS MOTOR

TECHNICAL FIELD

The disclosure relates generally to the control of electric motors, and more particularly to systems, devices, and methods useful in the commutation of current through windings of such motors.

BACKGROUND OF THE ART

To effectively drive a brushless direct current (BLDC) motor, a motor control system requires accurate information on the position of the rotor in relation to the stator. Sensors such as Hall effect sensors may be used to sense rotor position. However, the use of such sensors increases cost and weight, decreases reliability, and subjects the motor to temperature limitations imposed by the operational limitations of the sensors.

A form of sensorless control of (BLDC) motors is known; it typically involves estimation of the rotor speed and/or position based on induced electromotive force (EMF) or back-EMF occurring in an non-energized stator winding. One known technique involves monitoring zero voltage crossings in the EMF generated in the non-energized (non-driven) motor winding in order to determine the position of the rotor. The position of the rotor is then fed back to a commutating circuit to provide a proper commutation sequence to stator windings. Examples of such motors are disclosed in U.S. Pat. No. 5,057,753 to Leuthold et al. and U.S. Pat. No. 5,231,338 to Bulgarelli et al. Difficulties are however encountered at high speed applications with known techniques of monitoring zero voltage crossings in the EMF generated in the non-energized motor winding. Improvement in sensorless control is therefore desirable.

SUMMARY

The disclosure describes electric machines, and more particularly to systems, devices, and methods useful in the commutation of current through windings of electric machines.

In one aspect, for example, the disclosure describes a method for generating a signal useful in the commutation of current through windings of a brushless electric motor. The method comprises: detecting a kickback pulse in a non-driven winding of the motor; detecting a rotor-induced zero crossing in the non-driven winding following the detection of the kickback pulse; and using the detection of the rotor-induced zero crossing to generate a signal useful in commutation of current through the windings of the motor.

In another aspect, the disclosure describes a brushless direct current electric motor comprising: a stator and a cooperating permanent magnet rotor, the stator having a plurality of windings; and circuitry configured to: detect a kickback pulse in at least one of the windings when that winding is not driven; detect a rotor-induced zero crossing in the non-driven winding following the detection of the kickback pulse; and use the detection of the rotor-induced zero crossing to generate a signal useful in control of the motor.

In a further aspect, the disclosure describes a position sensing circuit for use in a brushless electrical motor comprising a stator and a rotor. The position sensing circuit comprises: means for detecting a kickback pulse in a non-driven winding of the stator; means for detecting a rotor-induced zero crossing in the non-driven winding following the kickback pulse; and means for using the detection of the rotor-induced zero crossing to generate a signal representative of the position of the rotor in relation to the stator.

Further details of these and other aspects of the subject matter of this application will be apparent from the detailed description and drawings included below.

DESCRIPTION OF THE DRAWINGS

Reference is now made to the accompanying drawings, in which:

FIG. 3A shows a graphical representation of current, voltage and a digital state representative of sensed voltage in a stator field winding during operation of a motor such as that shown in FIG. 1;

DETAILED DESCRIPTION OF THE PREFERRED EMBODIMENTS

Various aspects of preferred embodiments are described through reference to the drawings.

The following description relates to control of a 3-phase sensorless BLDC motor and may be suited for use, for example, with machine configurations such as those described in the applicant's U.S. Pat. Nos. 6,965,183; 7,262,539; 7,288,910 and 7,443,642, the entire contents of which are incorporated herein by reference.

The operation of a BLDC motor can be improved through the use of accurate information on the position of the permanent magnet rotor in relation to the stator. The position of a permanent magnet rotor may be obtained using sensors such as Hall effect sensors. However, there are applications where sensorless control is desired. Benefits of the sensorless solution include, for example, the elimination of position sensors and their connections between the control system and the motor; reduced cost and weight; improved reliability and the removal of temperature limitations imposed by the operational limitations of the position sensors.

Figure 1:
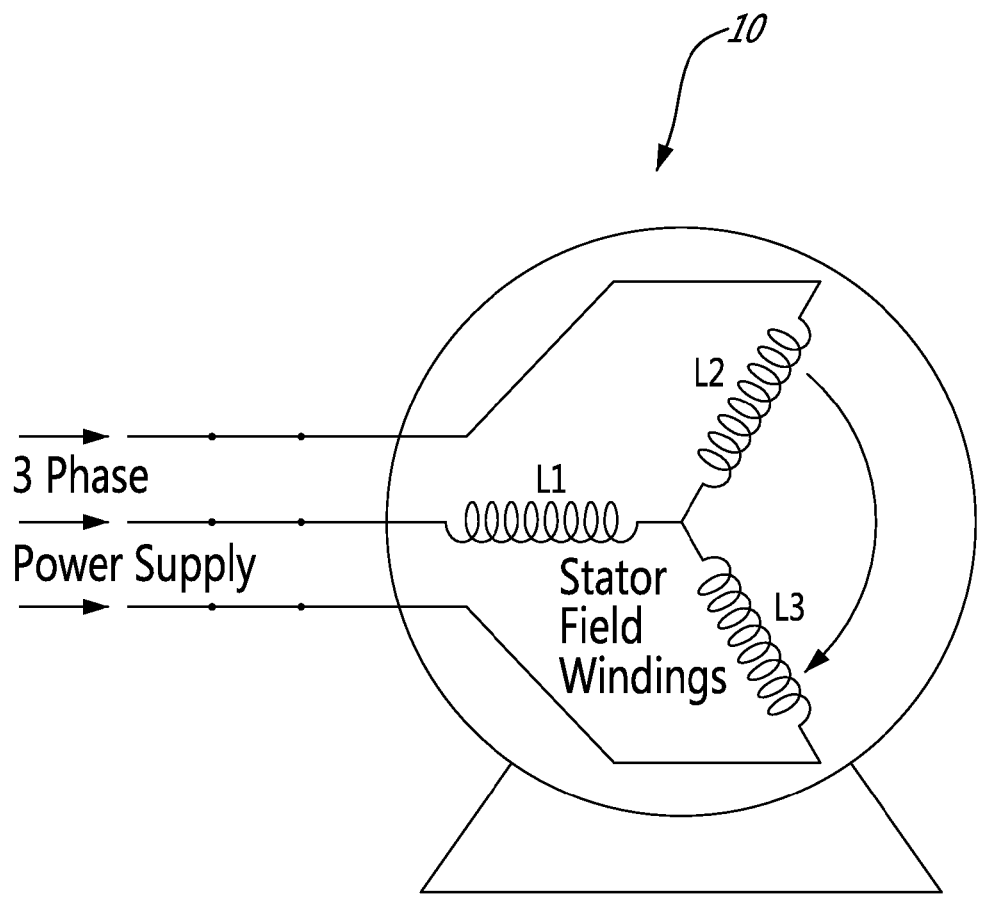
FIG. 1 is a partial schematic representation of a 3-phase sensorless brushless direct current (BLDC) motor including stator field windings.

FIG. 1 shows a partial schematic representation of a 3-phase BLDC motor 10, including stator field windings L1, L2 and L3. Motor 10 may comprise a rotor (not shown) having at least one permanent magnet (not shown) in addition to a stator comprising field windings L1, L2 and L3. It is to be understood that motor 10 may be an electrical machine that may operate either as a motor or as a generator.

Figure 2:
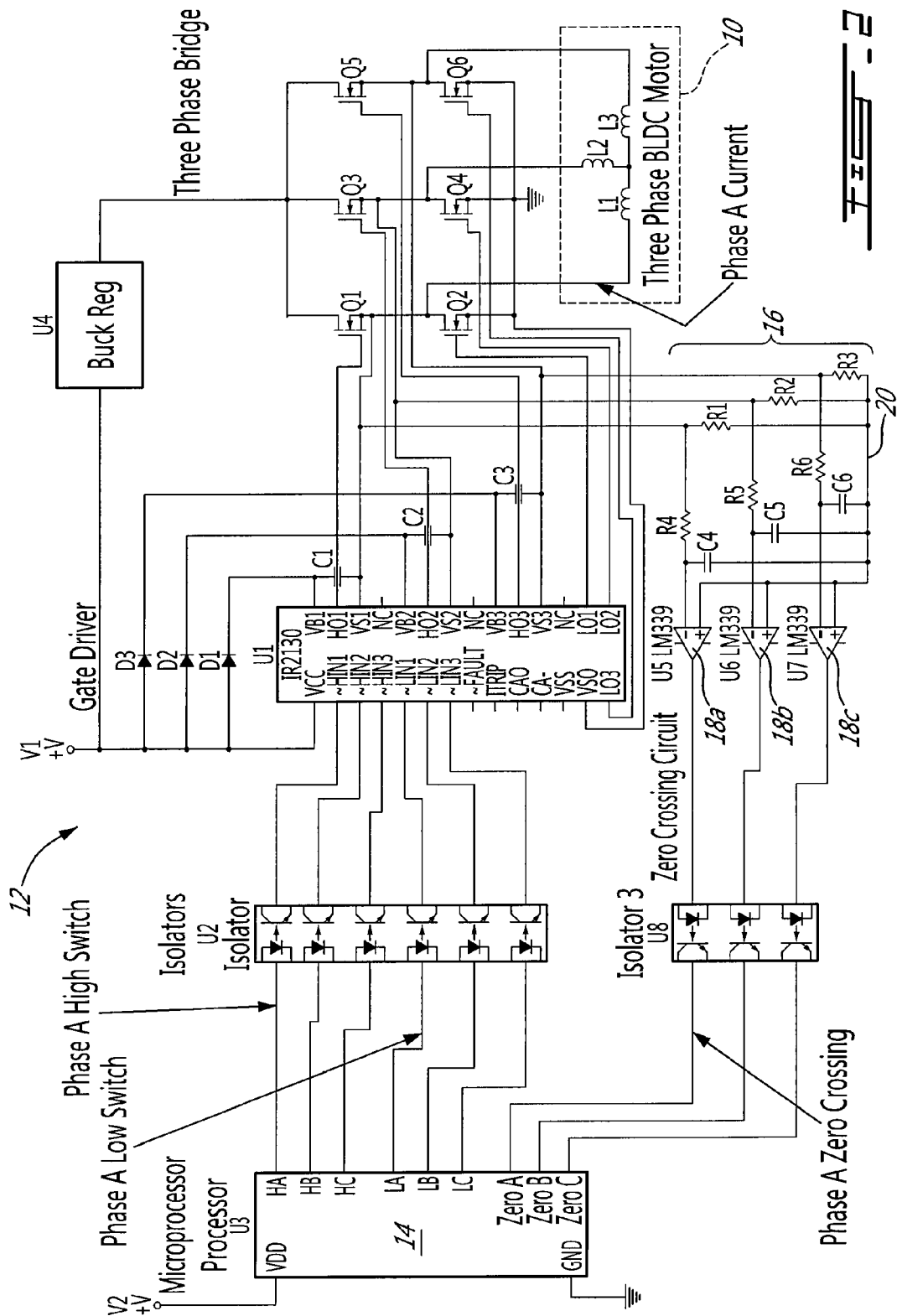
FIG. 2 is a schematic representation of a motor drive circuit that may be used to drive a motor such as that shown in FIG. 1.

FIG. 2 shows a motor drive circuit 12 suitable for use in driving motor 10 in accordance with the disclosure herein. In the embodiment shown, drive circuit 12 includes microprocessor 14, a zero crossing circuit, generally shown at 16, and other components. Motor drive circuit 12 can further comprise circuitry useful for controlling motor 10 and commutating an input current through windings L1, L2 and L3 to cause the rotor to rotate in relation to the stator. As shown in FIG. 2, the power phases commutated to field windings L1, L2 and L3 may be identified as phases A, B and C respectively.

Motor drive circuit 12 may comprise any circuit configuration suitable for zero crossing detection and for determination of rotor position that is known in the art. In an exemplary analog embodiment, zero crossing circuit 16 may be used to detect occurrences of zero crossings in at least one of windings L1, L2 and L3 of motor 10 and provide feedback to microprocessor 14 of the occurrences of zero crossings. A zero crossing occurs when a magnitude of a voltage sensed in a winding (e.g. L1, L2 or L3) changes from a positive value to a negative value or from a negative value to a positive value relative to a neutral. Accordingly, zero crossing circuit 16 may comprise voltage comparators 18$a$, 18$b$ and 18$c$ that may be used, for example, to compare one or more voltages sensed in windings L1, L2 and L3, with corresponding reference voltage(s) in order to detect zero crossings when windings L1, L2 and L3 are non-driven. The reference voltage used for comparison may for example be generated virtual neutral 20. Zero crossing circuit 16 may also comprise signal conditioning capabilities such as low-pass filtering.

In an exemplary digital embodiment, analog voltages in windings L1, L2 and L3 may be converted to digital signals and fed to an appropriate circuit for detection of the appropriate value. In any case, suitable circuitry for determining the rotor position may comprise conventional circuitry typically used in conjunction with motor systems having Hall effect position sensors.

FIG. 3A shows exemplary traces representative of current, voltage and a digital state representative of the sensed voltage in winding L1 (phase A) of a motor 10 during commutation. The "Phase A Zero Crossing" plot 22 of FIG. 3A shows output of a zero crossing circuit 16 as a digital state showing when the voltage in is either greater or less than zero. Thus, the output of zero crossing circuit 16 changes state as the phase A voltage crosses from either a positive voltage to a negative voltage or from a negative voltage to a positive voltage. Output from zero crossing circuit 16 is provided to microprocessor 14 for further processing and is used for commutation of motor 10.

During operation, motor 10 may be started using, for example, methods that are known in the art. Motor drive circuit 12 may be used to control motor 10 by suitably commutating input power through windings L1, L2 and L3 based on rotor position feedback received from zero crossing circuit 16. At every switching action (e.g., when current is switched off, as shown by line 24 in FIGS. 3A-3C), a kickback pulse in the voltage sensed in winding L1 (phase A), generally shown at 26, occurs in the now non-driven winding L1. Kickback pulse 26 essentially represents a voltage spike caused by residual current present when current through winding L1 is switched off. Kickback pulse 26 occurs due to the magnetic field collapse around the winding L1 as current to winding L1 is switched off and has a duration which is a function of the winding inductance and the dynamic resistance of the switching circuit (e.g. time=L/R). Kickback pulse 26 comprises two zero crossings, represented by leading edge 28 and falling edge 30. Leading edge 28 of kickback pulse 26 occurs when the current to winding L1 is first turned off and falling edge 30 of kickback pulse 26 occurs when the stored energy in winding L1 has decayed.

As the rotor rotates and the permanent magnet of the rotor passes the non-driven winding, such as winding L1 in this case, the motion of the permanent magnet relative to the winding induces back-EMF in the winding L1. Such rotor-induced back-EMF generally has a sinusoidal waveform which may be detected and used to determine the position of the rotor in relation to the stator. The rotor-induced back-EMF produces a rotor-induced zero crossing 32 when the rotor-induced back-EMF EMF crosses from either a positive voltage to a negative voltage or from a negative voltage to a positive voltage. The rotor-induced zero crossing 32 is representative of the position of the rotor in relation to the stator, and occurs subsequent to falling edge 30 of kickback pulse 26 in FIGS. 3A-3C. The detection of rotor-induced zero crossing 32 is of particular interest because it can be used to determine an angular position of the rotor in relation to the stator without requiring a separate sensor such as an encoder or a Hall effect sensor. The detection of rotor-induced zero crossing 32 may therefore be used, by the microprocessor 14 for example, in determining the commutation order.

Figure 3B:
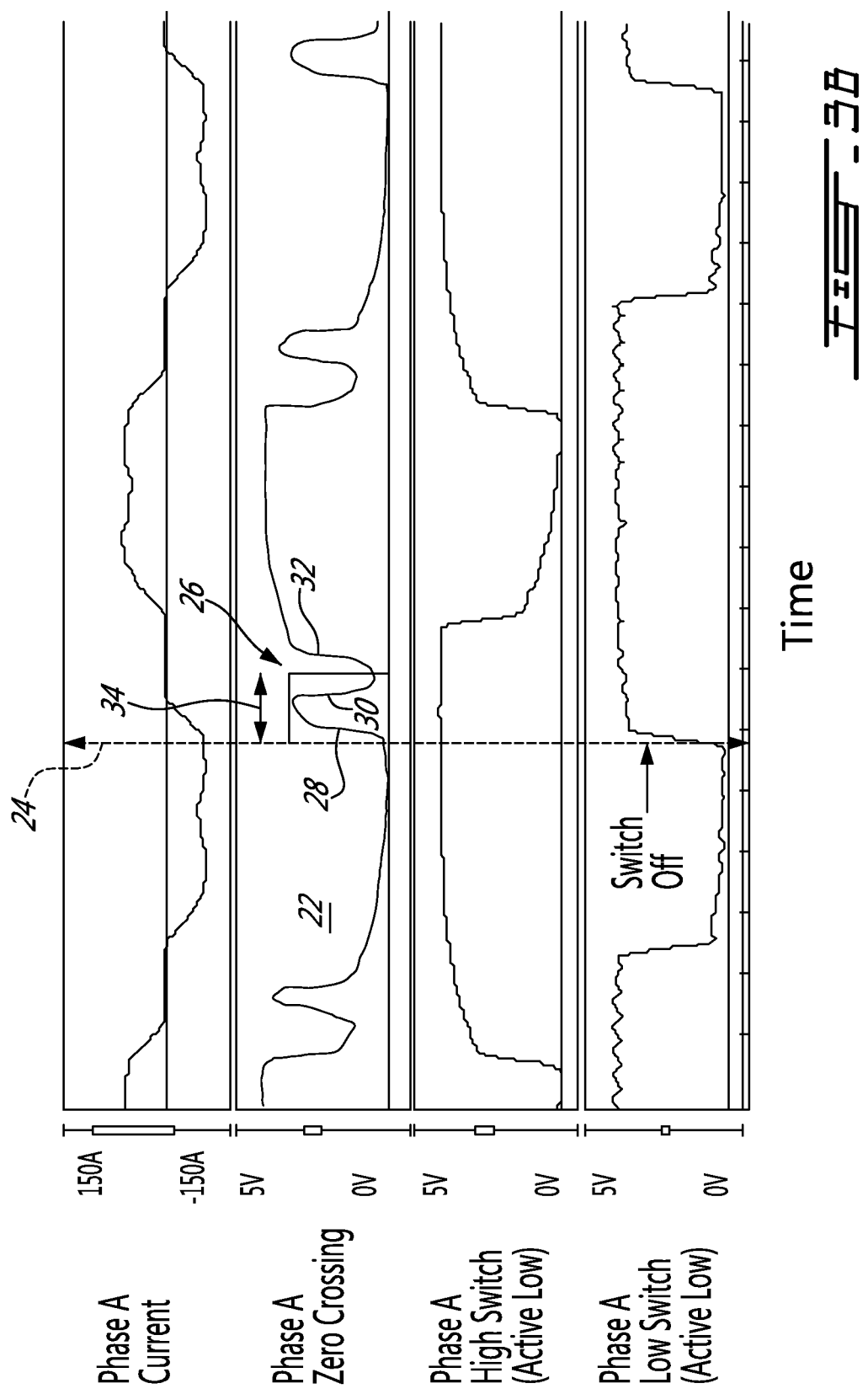
FIG. 3B shows the graphical representation of FIG. 3A, illustrating aspects of masking of a kickback pulse.

FIG. 3B illustrates a method for detecting rotor-induced zero crossing 32 which makes use of a masking delay 34. Masking delay 34 may be applied by microprocessor 14 and may be of fixed duration sufficient to ensure that the entire kickback pulse 26 has decayed before any zero crossing detection process may occur. Using this method, the first zero crossing that is detected following the delay 34 is presumably rotor-induced zero crossing 32 which follows kickback pulse 26. Masking delay 34 may be used to prevent erroneous zero crossing signals from being generated from any portion of kickback pulse 26. Basing the commutation cycle on erroneous zero crossing signals can lead to significant timing errors.

Typically, the duration of a masking delay 34 may be selected to take into account potential changes in the inductance of winding L1 and/or the resistance of the switching circuit which may affect the duration of kickback pulse 26. As a result, masking delay 34 may be selected to be longer than is strictly necessary. The use of masking delay 34 to mask the entire kickback pulse 26 may be effective for a particular speed range of motor 10, but as the speed of motor 10 increases, the time interval between falling edge 30 of kickback pulse 26 and rotor-induced zero crossing 32 is reduced. Consequently, as the speed of motor 10 approaches a certain threshold (determined, for example, by the geometry and other characteristics of the circuit components involved) there is a risk that rotor-induced zero crossing 32 may also become masked by masking delay 34. Masking rotor-induced zero crossing 32 would prevent rotor-induced zero crossing 32 from being detected and from being used to determine the commutation cycle. Hence, the use of masking delay 34 for masking kickback pulse 26 may limit the maximum speed at which motor 10 can operate.

Figure 3C:
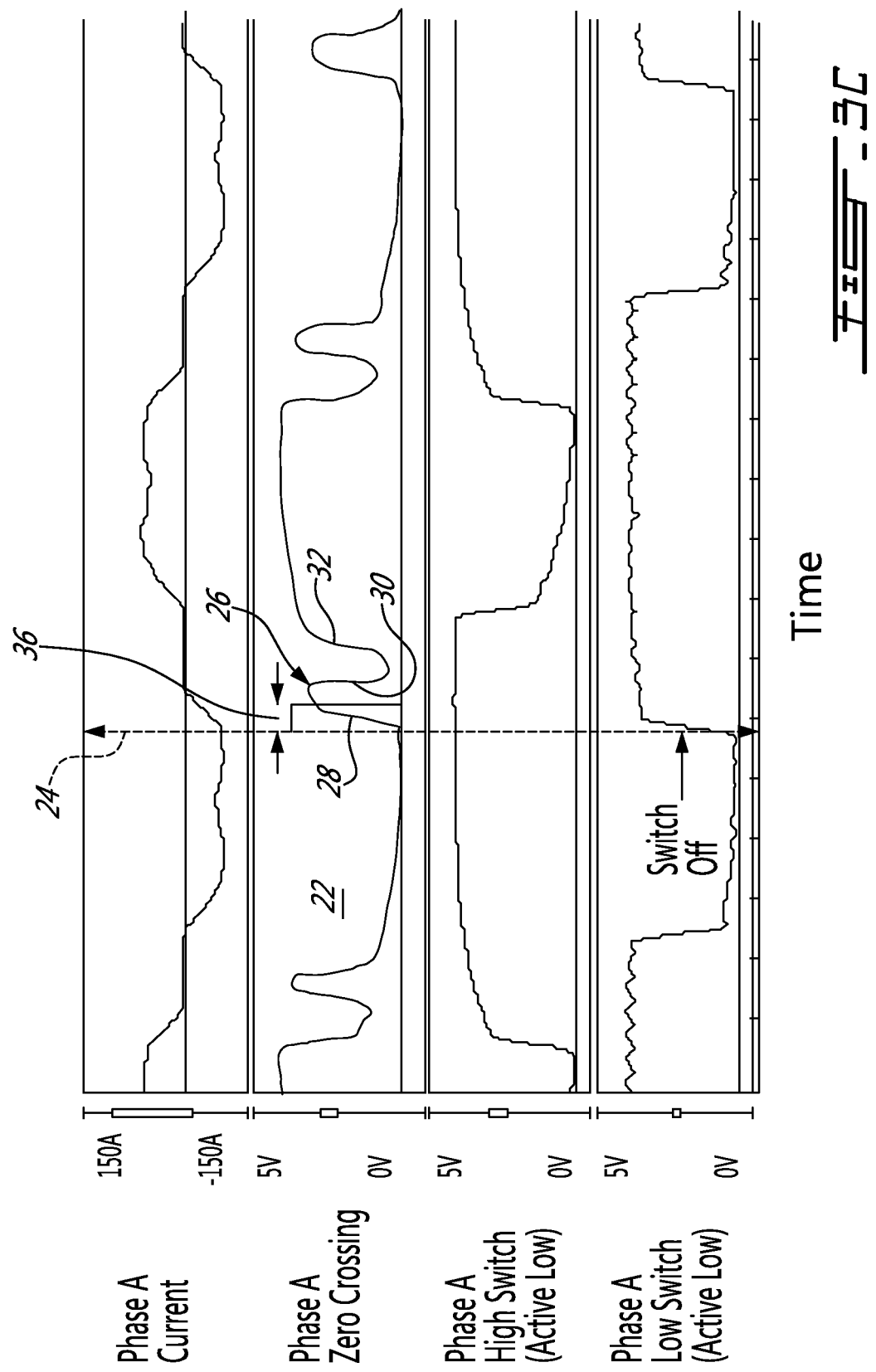
FIG. 3C shows the graphical representation of FIG. 3A, illustrating aspects of detection of a kickback pulse.

FIG. 3C is referenced to describe a novel method of detecting rotor-induced zero crossing 32 according to an exemplary embodiment. The present method may be used for generating a signal that is useful in the commutation of motor 10. The present method may detect kickback pulse 26 in non-driven winding L1, for example, instead of masking entire kickback pulse 26. Once the kickback pulse 26 has been detected, rotor-induced zero crossing 32 may be detected and the detection of rotor-induced zero crossing 32 may be used to generate a signal useful in the commutation of current through windings L1, L2 and L3 of motor 10.

In methods according to the disclosure, the detection of kickback pulse 26 may comprise masking (e.g. ignoring or blanking) only a portion of kickback pulse 26, such as only leading edge 28 of kickback pulse 26, and then detecting falling edge 30 of kickback pulse 26. Accordingly, a masking delay 36 of reduced duration may be used to mask only leading edge 28 of kickback pulse 26 as shown in FIG. 3C. Reduced masking delay 36 may be applied by microprocessor 14 when for example current to winding L1 is switched off and before initiating any zero crossing detection. As mentioned above, the detection of falling edge 30 of kickback pulse 26 and of rotor-induced zero crossing 32 may be done using zero crossing circuit 16. Once falling edge 30 of kickback pulse 26 has been detected it may be counted, and rotor-induced zero crossing 32 may be detected and used by microprocessor 14 to produce a signal useful in determining a commutation cycle of the motor 10. The detection of rotor-induced zero crossing 32 may be correlated to the position of the rotor in relation to the stator of motor 10. The signal may be used so that the excitation current provided to any one of windings L1, L2 and L3 may be properly timed and adjusted, if and as necessary, to drive windings L1, L2 and L3 to produce a desired output torque, etc. from motor 10. The detection of rotor-induced zero crossings may be conducted on any of or all of the windings L1, L2 and L3.

Among the many advantages offered by the systems and methods disclosed herein, detection of kickback pulse 26, or at least a portion of kickback pulse 26, instead of masking of the entire kickback pulse 26, significantly reduces, and in many cases practically eliminates, the risk of rotor-induced zero crossing 32 also becoming masked. Such methods and systems may also automatically adjust to variations in the duration of kickback pulse 26 caused by conditions of variable phase inductance or switching circuit resistance. Further, such methods and systems may be used to detect rotor-induced zero crossing 32 at higher operating speeds of motor 10.

According to other exemplary embodiments, kickback pulse 26 may be detected without the use of any masking delay. In such cases, leading edge 28 of kickback pulse 26 may also be detected instead of being masked. Therefore, leading edge 28 and falling edge 30 of kickback pulse 26 may be detected and counted, and then the third zero crossing detected would be rotor-induced zero crossing 32. As will be understood by those skilled in the relevant arts, in such cases the cycle time of any circuitry required for detection of zero crossings would need to be faster than the time interval between leading edge 28 and falling edge 30 of kickback pulse 26.

The above descriptions are meant to be exemplary only. Those skilled in the relevant arts will recognize that changes may be made to the embodiments described without departing from the scope of the present disclosure. For example, the method does not specifically require a 3-phase brushless DC motor but may be used with all types of brushless permanent magnet motors. A 3-phase winding may be preferred because in many cases it simplifies the associated electronics by allowing the use of commercially-available integrated circuits designed to be used with three Hall effect sensors to sense rotor position.

Methods and systems according to the disclosure may also be used in conjunction with motors serving as starter motors (not shown) driving shaft for, as an example, starting a gas turbine engine (not shown).

Detection of the kickback pulse may be accomplished through detection of any suitable portion of the kickback pulse. The entire kickback pulse does not necessarily need to be sensed.

It will also be understood by those skilled in the relevant arts that systems and methods according to the disclosure herein may be used in conjunction with motor having either "inside rotor" or "outside rotor" configurations. Still other modifications which fall within the scope of the described subject matter will be apparent to those skilled in the art, in light of a review of this disclosure, and such modifications are intended to fall within the appended claims.

What is claimed is:

1. A method for generating a signal useful in the commutation of current through windings of a brushless electric motor, the method comprising:

detecting a kickback pulse in a non-driven winding of the motor by masking a leading edge of the kickback pulse and detecting a falling edge of the kickback pulse;

detecting a rotor-induced zero crossing in the non-driven winding following the detection of the kickback pulse, generating a signal representative of the rotor-induced zero crossing; and using the signal representative of the rotor-induced zero crossing to generate a signal useful in commutation of current through the windings of the motor.

2. The method of claim 1, wherein the masking of the leading edge of the kickback pulse comprises the application of a delay.

3. The method of claim 2, wherein the detection of the falling edge of the kickback pulse comprises comparing a voltage sensed in the non-driven winding of the motor to a reference voltage.

4. The method of claim 1, wherein the detection of the kickback pulse comprises comparing a voltage sensed in the non-driven winding of the motor to a reference voltage.

5. The method of claim 1, wherein the detection of the rotor-induced zero crossing comprises comparing a voltage sensed in the non-driven winding of the motor to a reference voltage.

6. The method of claim 1, further comprising correlating the generated signal to a position of a rotor of the motor in relation to a stator of the motor.

7. A brushless direct current electric motor comprising:

a stator and a cooperating permanent magnet rotor, the stator having a plurality of windings; and circuitry configured to:

detect a kickback pulse in at least one of the windings when that winding is not driven by masking a leading edge of the kickback pulse and detecting a falling edge of the kickback pulse;

detect a rotor-induced zero crossing in the non-driven winding following the detection of the kickback pulse, generating a signal representative of the rotor-induced zero crossing; and use the signal representative of the rotor-induced zero crossing to generate a signal useful in control of the motor.

8. The motor of claim 7, wherein the circuitry is configured to mask a leading edge of the kickback pulse using a masking delay.

9. The motor of claim 7, wherein the circuitry comprises a voltage comparator to compare a voltage sensed in the non-driven winding of the motor to a reference voltage.

10. The motor of claim 9 wherein the plurality of windings comprise three phase windings.

11. The motor of claim 7, wherein the circuitry is configured to detect the rotor-induced zero crossing by comparing a voltage sensed in the non-driven winding of the motor to a reference voltage.

12. The motor of claim 11, wherein the reference voltage is a generated virtual neutral voltage.

13. The motor of claim 7 wherein the plurality of windings comprise three phase windings.

14. A position sensing circuit for use in a brushless electrical motor comprising a stator and a rotor, the position sensing circuit comprising:

means for detecting a kickback pulse in a non-driven winding of the stator by masking a leading edge of the kickback pulse and detecting a falling edge of the kickback pulse;

means for detecting a rotor-induced zero crossing in the non-driven winding following the kickback pulse and generating a signal representative of the rotor-induced zero crossing; and means for using the signal representative of the rotor-induced zero crossing to generate a signal representative of the position of the rotor in relation to the stator.

15. The circuit of claim 14, comprising means for comparing a voltage sensed in the non-driven winding to a reference voltage.

16. The circuit of claim 15, wherein the reference voltage is a generated virtual neutral.

17. The circuit of claim 16, wherein the means for masking is configured to apply a delay for masking a leading edge of the kickback pulse.

* * * * *